Figure 1A:
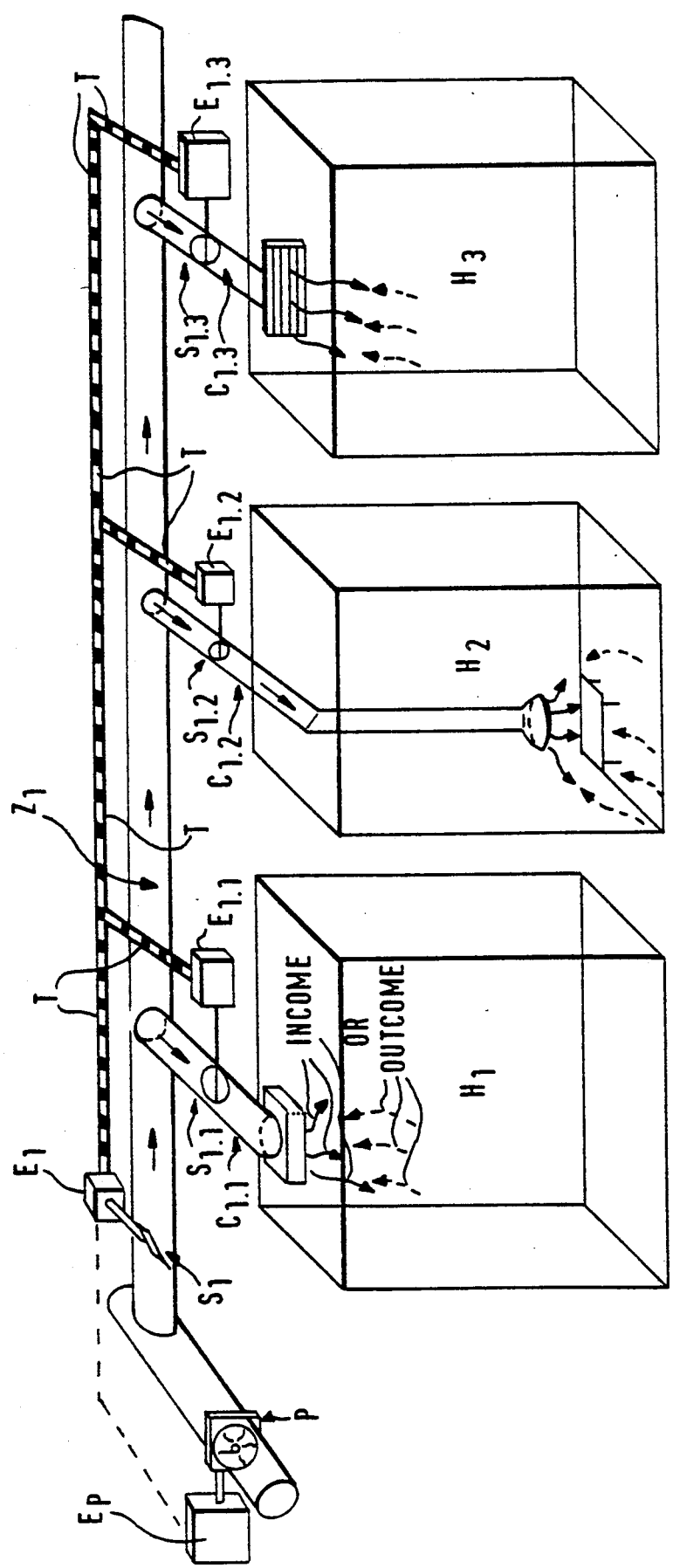

United States Patent [19]

Aalto et al.

[11] Patent Number: 5,071,065
[45] Date of Patent: Dec. 10, 1991

[54] PROCEDURE FOR CONTROLLING AND MAINTAINING AIR CURRENTS OR EQUIVALENT IN AN AIR-CONDITIONING INSTALLATION, AND AN AIR-CONDITIONING SYSTEM ACCORDING TO SAID PROCEDURE

[75] Inventors: Erkki Aalto; Timo Mattila, both of Kausala; Mertsi Niemelä, Lahti; Pertti Rantanen, Jaala, all of Finland

[73] Assignee: Halton OY, Finland

[21] Appl. No.: 566,392

[22] PCT Filed: Jan. 11, 1990

[86] PCT No.: PCT/FI90/00010
§ 371 Date: Aug. 17, 1990
§ 102(e) Date: Aug. 17, 1990

[87] PCT Pub. No.: WO90/08293
PCT Pub. Date: Jul. 26, 1990

[30] Foreign Application Priority Data

Jan. 13, 1989 [FI] Finland .................................. 890170

[51] Int. Cl.⁵ .............................................. F24F 7/00
[52] U.S. Cl. ..................................... 236/49.3; 165/22; 364/505
[58] Field of Search ......................... 236/49.3; 165/22; 364/505, 557

[56] References Cited

U.S. PATENT DOCUMENTS

| | | | |
|---|---|---|---|
| 4,205,381 | 5/1980 | Games et al. | 364/505 |
| 4,497,031 | 1/1985 | Froehling et al. | 364/505 |
| 4,616,325 | 10/1986 | Heckenbach et al. | 364/505 |
| 4,630,221 | 12/1986 | Heckenbach et al. | 364/505 |
| 4,821,526 | 4/1989 | Otsuka et al. | 165/22 X |
| 4,843,084 | 1/1989 | Parker et al. | 364/505 |

FOREIGN PATENT DOCUMENTS

| | | |
|---|---|---|
| 0238979 | 9/1987 | European Pat. Off. . |
| 2715835 | 10/1978 | Fed. Rep. of Germany . |
| 3124966 | 1/1983 | Fed. Rep. of Germany . |
| 2190216 | 11/1987 | United Kingdom . |

Primary Examiner—William E. Wayner
Attorney, Agent, or Firm—Steinberg & Raskin

[57] ABSTRACT

The present invention concerns a procedure and apparatus for controlling and maintaining air currents or equivalent in an air-conditioning installation or equivalent. The air-conditioning installation comprises one or several air-conditioning machines (P) for producing the desired flows, and one or several duct systems for conducting the flows into the desired room spaces ($H_1, H_2$ ...) or equivalent and/or out from the room spaces ($H_1, H_2$ ...) or equivalent. The duct systems consist of requisite trunk, zone and room duct systems (R,Z,C). In the procedure the air flow rates required at any given time in the air-conditioning system are determined on the basis of the air temperature and/or air quality and/or air noise levels and/or air pressure conditions and/or other similar factors. On the basis of the respective air flow rates determined by calculation, a combination of the set values for all control members ($S_1, S_{1.1}, S_{1.2}$ ...) and air-conditioning machines (P) are thereafter determined at the same time, and the control members ($S_1, S_{1.1}$ ...) and the air-conditioning machines (P) are at the same time set to settings consistent with said set value combination, whereby the above mentioned air flow rates will be realized.

9 Claims, 6 Drawing Sheets

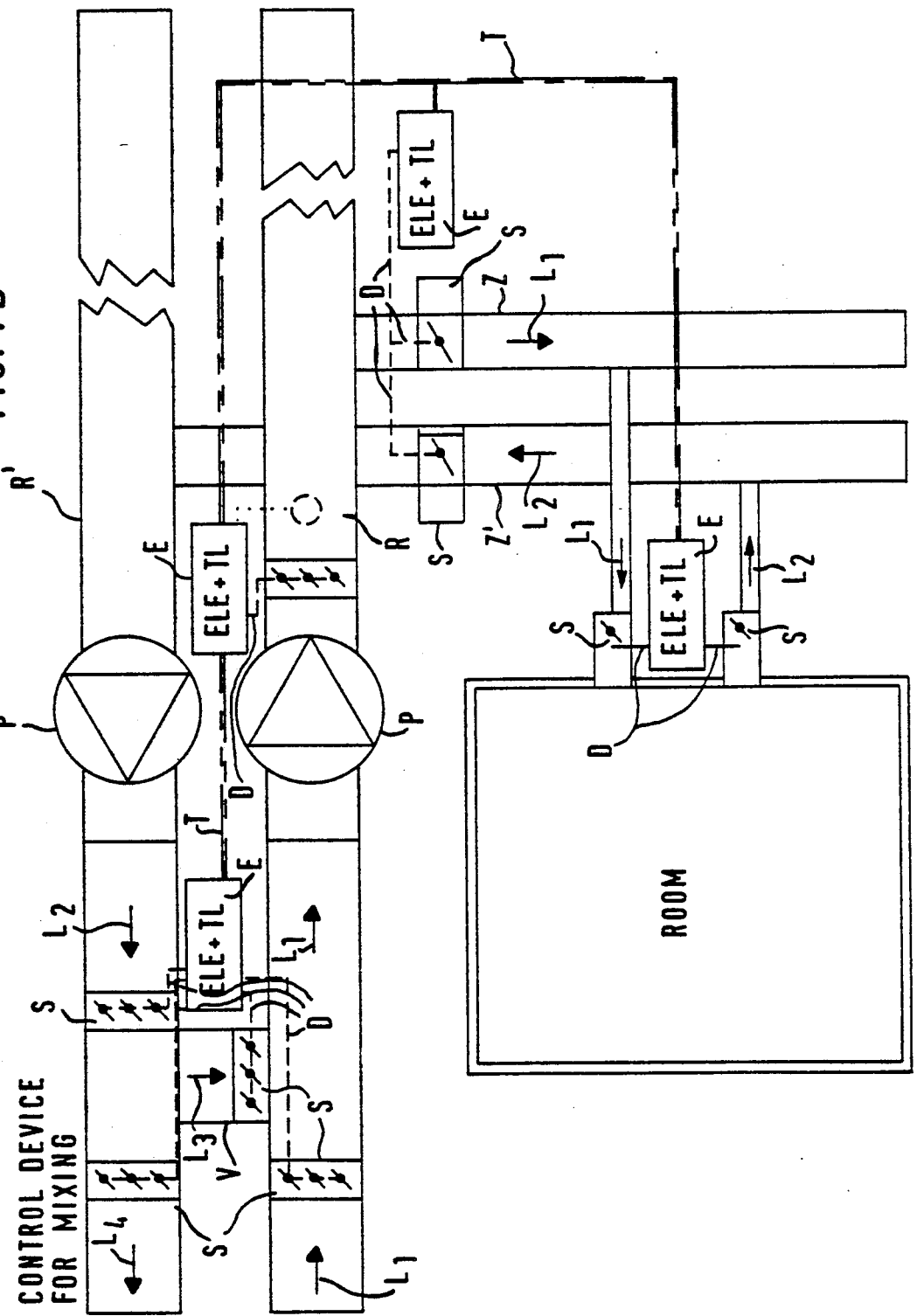

PROCEDURE FOR CONTROLLING AND MAINTAINING AIR CURRENTS OR EQUIVALENT IN AN AIR-CONDITIONING INSTALLATION, AND AN AIR-CONDITIONING SYSTEM ACCORDING TO SAID PROCEDURE

The present invention concerns a procedure for controling and maintaining air currents or equivalent in an air-conditioning installation, and an air-conditioning system according to said procedure.

The control and adjustment of air-conditioning installations are nowadays based on the use of pick-ups and controllers and control members of different kinds. Theoretically, the installations are expected to operate well, but in practice soiling, ageing and electrical creeping, insensitivity of the pick-ups, as well as difficulties in finding appropriate locations for pick-ups result in that majority of even the most modern air-conditioning installations operate unsatisfactorily. Defects occur in particular in energy economy and in optimizing the use. Moreover, feeling of well-being is unsatisfactory.

The object of the invention is, therefore, a novel air-conditioning system in which the efficiency of the system has been increased. The design of the invention is based on a system in which the properties of the air-conditioning apparatus, control means and ducts, and in particular, the specific graphs of the air-conditioning apparatus and control means are known. In the system of the invention such components are used which are controllable in setting and in which the control setting is further transmitted to a controller unit. In the system according to the invention, a controller unit comprises, stored in its memory, the operation parametres and specific graphs of the control member used in the system. The control units of different control members are functionally interconnected through data transmission buses. When one control member of the system is affected in the system of the invention, checking is immediately carried out concerning the other control members to find out whether they are in need of a setting repair owing to the new position of said control member.

As taught by the invention, a system has been provided which comprises a trunk duct system and zone ducts branching from the trunk duct. From the zone ducts are further provided incoming lines to the spaces to be air-conditioned. The invention teaches that the system may further comprise corresponding parts on the air outlet side, a duct going out of the space to be air-conditioned, said duct terminating in a zone duct which leads further to the trunk duct of the outlet side. Furthermore, the system comprises an air conditioning apparatus, preferably a blower producing air flow and being located in the trunk line. In the system of the invention the trunk line may further comprise control members, e.g. control dampers. The zone ducts branching from the trunk line comprise further a duct opening control member located in the adjacency of the joining point of the duct and the trunk line, advantageously a control damper. Respectively, an inlet duct branching from the zone line to the space to be air-conditioned comprises a control member, advantageously a control damper. The control member may, however, be in the design of the invention any control means. Similarly, in the system of the invention the air-conditioning machine may preferably be a blower, but also any other air flow producing apparatus.

What is fundamental to the system of the invention is that when a control member of the system is affected e.g. in order to increase the need of air-conditioning and incoming air in a room space, information concerning this aspect is transmitted further to other control members of the system. First, the control members of the zone line are affected, and if an increased quantity of air is needed through the blower connected to the trunk line, the rpm volume of the blower is further increased, or increasing the air quantity entering through the trunk line is affected in other ways. In the system of the invention the positions of the control members are determined through programs utilizing the system.

The entire system design may be located in a controller unit of a control member of a duct leading to a space to be air-conditioned, or in the controller unit of a control member of a zone, or said design may be located in the controller unit of an air-conditioning machine of the trunk duct. In the system of the invention, a data transfer connection exists between all controller units. It is essential of the system that all controller units are connected to a common data transfer bus and make use of any medium and data transfer protocol relevant at each moment.

The procedure of the invention is mainly characterized in that the volumetric air flow rates of the air-conditioning system required at different points at different times are defined in the procedure on the basis of the air temperature and/or air quality and/or air noise levels and/or air pressure conditions, and/or other equivalent factors, and on the basis of the defined volumetric air flow rates, at the same time the combination of the set values of the control members and of the air-conditioning machines is determined with which the defined volumetric air flow rates are realized, and at the same time the required control members and air conditioning machines are set to the set values consistent with said set value combination, and that when any air current in the system, respectively its volumetric flow rate is changed, a new set value system is determined for the control members and for the air-conditioning machine, and the control members and the air-conditioning machines are set to the settings implied by the new combination.

The system of the invention is mainly characterized in that the main duct comprises a control member controlling the total volumetric air flow rate of the main duct, and a controller unit therefor, and control members controling the volumetric air flow rate of the branch ducts in the branch ducts, and controller units therefor, and that between the controller units of the control members of the main duct and the controller units of the control members of the branch ducts exists a data transfer connection through data transfer buses or equivalent, whereby the setting of the actuating means controlling the volumetric air flow rate of the control members of the branch ducts is determined centrally and at the same time by the set value combination derived from the controller unit of the control member of the main duct.

The invention is described in the following, referring to the advantageous embodiments of the invention presented in the figures of the appended drawing.

FIG. 1A presents the procedure and the system according to the invention axonometrically and schematically.

FIG. 1B presents the system of the invention schematically.

Figure 2:
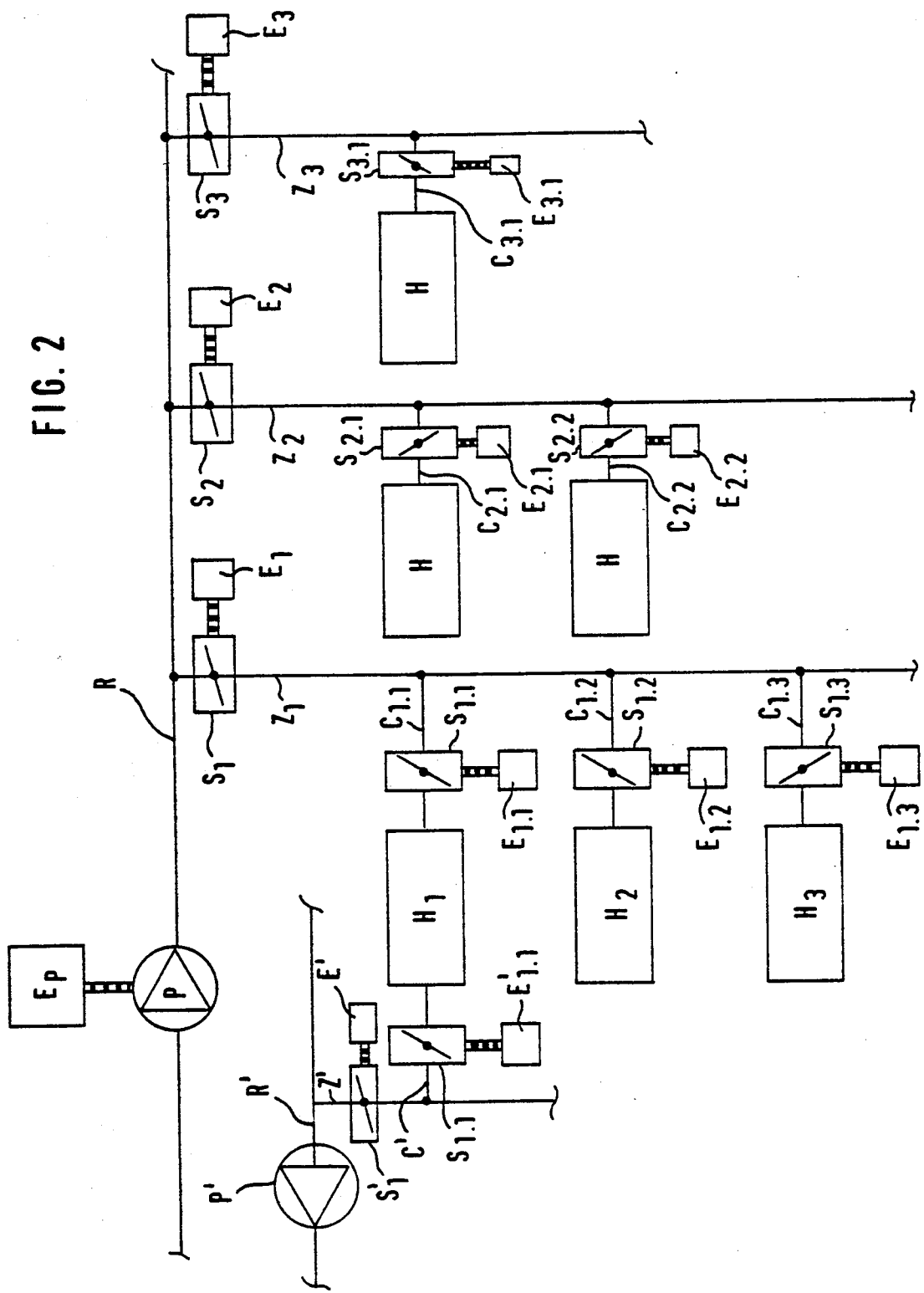

FIG. 2 presents the schematically the duct systems, the control members and controller units associated with the system and the procedure.

Figure 3:
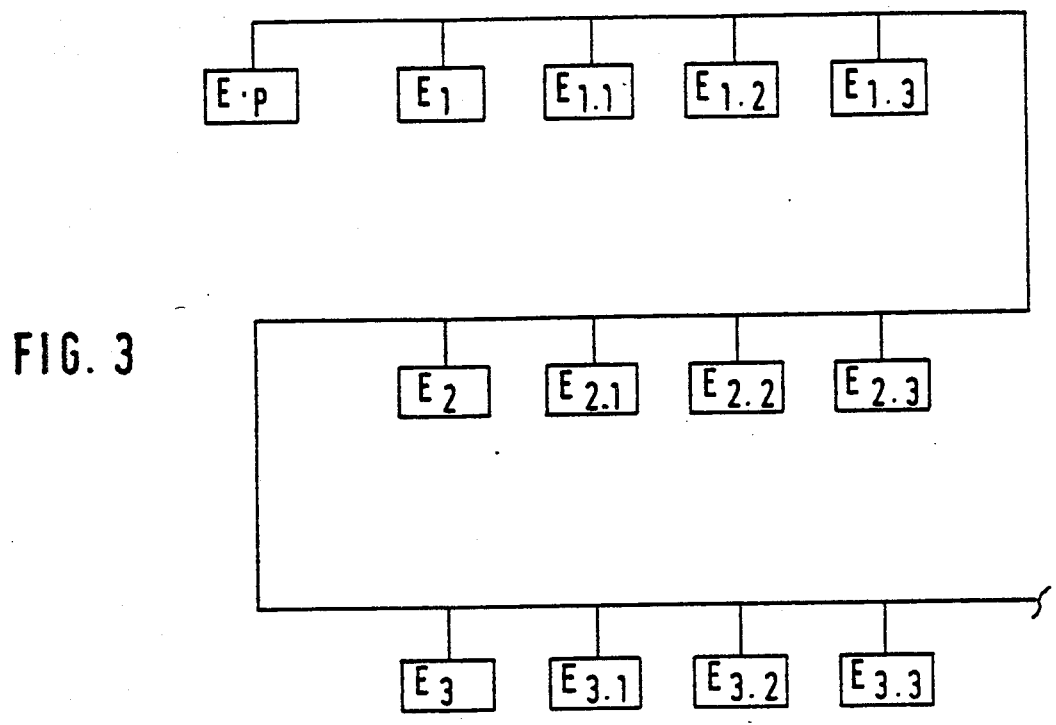

FIG. 3 presents the serial connection of the controller units.

Figure 4:
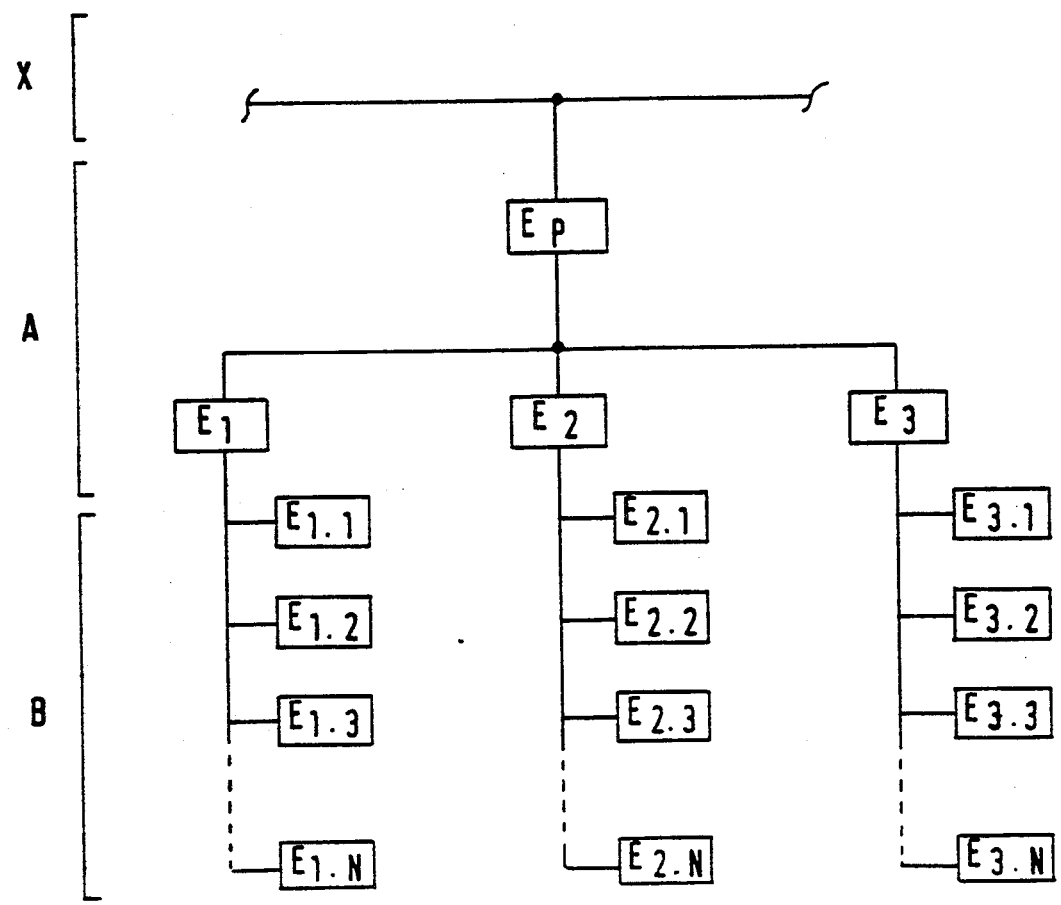

FIG. 4 presents another, parallel connecting mode of the controller units.

Figure 5:
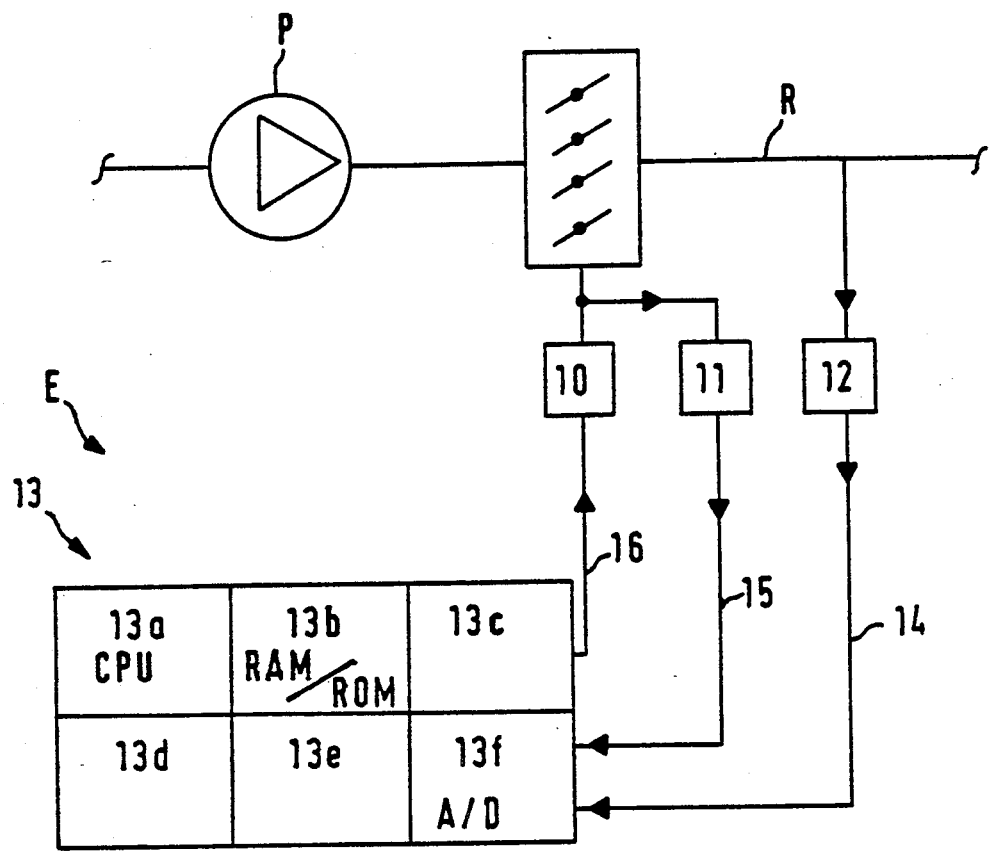

FIG. 5 presents a control damper after the blower disposed in the trunk duct and an advantageous embodiment of its controller unit as block diagram.

Figure 6:
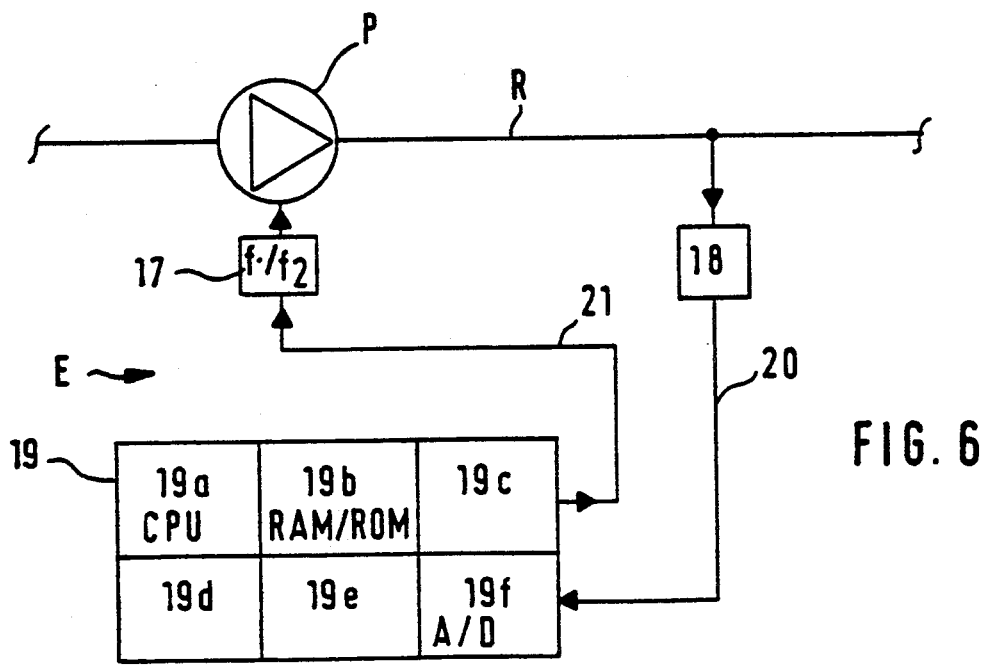

FIG. 6 presents as block diagram an advantageous embodiment of a blower controller units $E_p$ disposed in the trunk duct.

Figure 7:
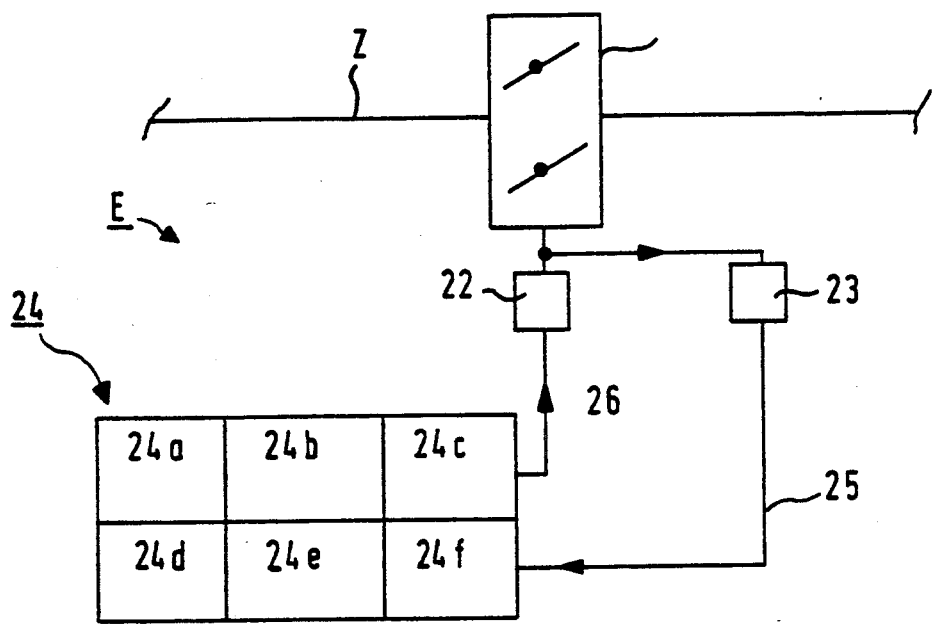

FIG. 7 presents as block diagram an advantageous embodiment of the controller unit E of a control damper disposed in the zone duct.

Figure 8:
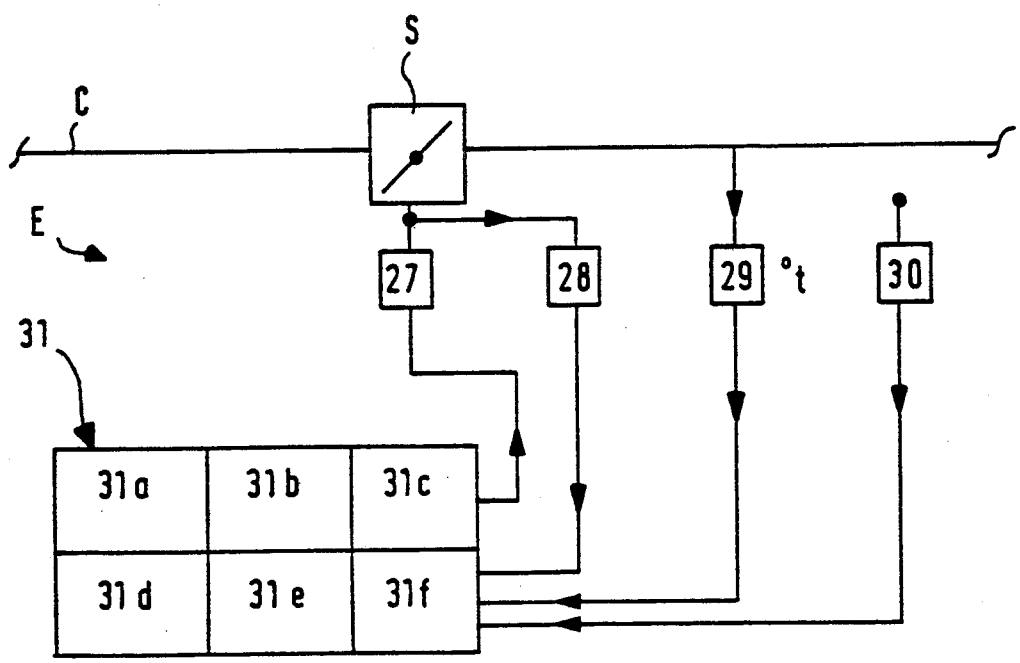

FIG. 8 presents a control member disposed in the incoming air duct C leading to a space to be air controlled and an advantageous embodiment of its controller unit, as block diagram.

In FIG. 1A is presented axonometrically and schematically the system and the apparatus system according to the invention. In the air-conditioning system of the invention, the most comprehensive embodiment thereof comprises at least one main duct and branch ducts branching therefrom, which are disposed to lead into rooms, spaces or equivalent to be air-conditioned, or to focussed ventilation points. In the procedure of the invention, air is removed from the above-mentioned points (broken line arrows) or fresh air is carried into said points (integral line arrows). At least one air-conditioning machine P is included to provide air flow. As taught by the invention, the main duct $Z_1$ comprises a control member $S_1$ to control the total air flow rate of the main duct. The control member $S_1$ has been disposed to a position before the branching points between the main duct and the branch ducts. Each branch duct $C_{1.1}, C_{1.1}, 1.1$ is further provided with control members $S_{1.1}, S_{1.2}, S_{1.3}$ controlling the air flow passing through the branch duct, and particularly the volumetric air flow rate. Both the control member of the main duct and the control members of the branch ducts comprise each a controller unit $E_1; E_{1.2}, E_{1.3}$. The controller unit $E_1$ of the main duct is placed on a higher level in the controlling hierarchy than the controller units $E_{1.1}, E_{1.2}, E_{1.3}$ of the branch ducts. This means that the controller unit $E_1$ of the main duct has been disposed to govern and control the control members $S_{1.1}, S_{1.2}, S_{1.3}$ of the branch ducts through their controller units $E_{1.1}, E_{1.2}, E_{1.3}$. In this manner in the procedure and in the system of the invention a data transfer connection exists between the controller unit of the control member of the main duct and the controller units of the control members of the branch ducts: either a wireless data transfer connection or said connection has been arranged through cables T or other equivalent data transfer buses. In the procedure of the invention the set values are delivered from the controller unit $E_1$ of the control member of the main duct to the controller units $E_{1.1}, E_{1.2}, E_{1.3}$ of the control members of the branch ducts. Said set values are given simultanously from the controller unit of the control member of the main duct to said controller units of the control members of the branch ducts. The set values are transmitted to all control members, to the controller units thereof; in addition to the control member of the main duct is transmitted a set value defined by the combination, irrespective of whether it is the same as or different from the one in an earlier setting time.

In the procedure of the invention the volumetric air flow rates required at times are defined on the basis of the air temperature and/or air quality and/or air noise levels and/or air pressure conditions or other similar factors. Said defining may be carried out in the course of a given, predeterminable period of time. Based on said air currents, a set value combination of the control members and the air conditioning machines is determined simultaneously. Thus, in the procedure of the invention the control members and the air-conditioning machines are set simultaneously to settings consistent with the set value combination. With said set values of the set value combination, the required volumetric air flow rates defined by calculation are realized to the air-conditioning targets and from the targets of the system. The set value combination comprises the set values defined by calculation for all control members and air-conditioning machines of the system.

For set values the setting data of the actuating members controlling the volumetric air flow rate of the control members are used either directly or indirectly.

An air resistance coefficient may be given as a set value. Said air resistance coefficient may be given regarding the respective control member or a larger entity associated with the control member. In the form of a set value for machines producing air flow may also be given e.g. rpm data or equivalent control data of the apparatus changing the air flow rate.

Determining a set value combination takes place in the control system employing an air-conditioning balancing calculation method known in itself in the art. The data required in controlling the control members and the air conditioning machines are stored advantageously in a separate memory of the controller unit of each control member and air-conditioning machine. The memory of each controller unit may comprise, for instance, an air resistance coefficient and governing data required in governing the control member associated therewith, said data setting the actuating means controlling the air flow of the control member to a setting defined by the air resistance coefficient. In the memory of each control member may also be stored other recorded data required in seting the control member, e.g. flow technology values of said control member.

FIG. 1B presents the operation diagram of the system according to the invention. As shown in the figure, the system comprises a trunk duct R. From the trunk duct is branched a zone duct Z. From the zone duct Z branches further an incoming air duct C leading to a space to be air-conditioned, for instance to a room. Respectively, an outlet air duct C' leads out of the space to be air-conditioned to a zone duct Z' on the outlet side, being further connected to the trunk duct R' of the outlet side.

The trunk duct R comprises an air-conditioning apparatus P, preferably a blower, and a control member S, preferably a control damper, placed after the air-conditioning apparatus P.

In the zone duct Z branching from the trunk duct R is located a control member S at the beginning of the zone duct, respectively a control member S is located in the incoming air duct C leading to the space to be air-conditioned. The control members may be e.g. control dampers. Respectively, a control member S is also located in the zone duct Z' of the outlet side. They are advantageously control dampers. In the trunk duct R' of the outlet side is located an air-conditioning apparatus P' causing the air to exit out from the room space. The air-conditioning apparatus is advantageously an outlet blower. On the outlet side of the outlet blower P' and on the drawing side of the incoming air blower P is located a mixing unit.

As shown by arrow $L_1$, air enters drawn by the air-conditioning apparatus P, advantageously by a blower, into the trunk duct R and travels through a control member S, advantageously a control damper, into the zone duct Z and branches therefrom to the incoming air duct C leading further to a space to be air-conditioned. The air to be removed from the space to be air-conditioned is presented by arrows $L_2$. The air leaves through the outlet air duct C' of the outlet side connected with the zone duct Z' and passes further from zone duct Z' into the trunk duct R' of the outlet side, and further from there by the aid of suction provided by the outlet blower P' into the mixing unit wherein part $L_3$ of the air flow is branched through a by-pass duct V of the mixing unit back to the incoming air current $L_1$, and part $L_4$ of the air flow passes through the control dampers out of the mixing control unit.

In the system of the invention each control member S is controlled by control units E. The control units E are with data transfer connection interconnected through data transfer buses T. Respectively, the control units E are in data transfer connection to the control members S, to the setting apparatus thereof, through a governing member D.

In FIG. 2 is presented more in detail the air-conditioning system of the invention. The air-conditioning apparatus P is disposed into the trunk duct R. The zone ducts $Z_1, Z_2 \ldots Z_n$ are branched from the trunk duct R. Each zone duct $Z_1, Z_2 \ldots Z_n$ comprises a control member S at the beginning of the duct line. The zone duct $Z_1$ comprises a control member $S_1$, the zone duct $Z_2$ comprises a control member $S_2$ and the zone duct $Z_n$ comprises a control member $S_n$. The control members may be e.g. control dampers or other flow controlling actuating apparatus. The control member $S_1$ of the zone duct $Z_1$ is controlled by a control unit $E_1$. The control member $S_2$ of the zone duct $Z_2$ is controlled by a control unit $E_2$; respectively, the control member $S_n$ of the zone duct $Z_n$ is controlled by a control unit $E_n$.

From each zone duct $Z_1$, one or several incoming air ducts C are branched leading into the space to be air conditioned. Into the incoming air duct C leading into the space to be air-conditioned, a control member S controlling the air flow, for instance a control damper, has been disposed.

In a duct $C_{1.1}$ leading into a space $H_1$ to be air-conditioned is disposed a control member $S_{1.1}$, the opening set value whereof being controlled by a control unit $E_{1.1}$. Respectively, an incoming air duct $C_{1.2}$ leading to a space $H_2$ to be air-conditioned comprises a control member $S_{1.2}$ disposed in the duct, which is controlled by a control unit $E_{1.2}$.

A plurality of branch ducts $C_{11}, C_{12} \ldots C_{21}, C_{22}$ may lead from each zone duct $Z_1, Z_2 \ldots$ into spaces H to be air-conditioned, being consistent with the number of the spaces on the zone duct which are to be air-conditioned.

In the figure is depicted an outlet duct C' leading to one space to be air-conditioned. The outlet duct is connected to a zone duct 2' of the outlet side, which is further connected to the trunk duct R' of the outlet side. Respectively, the trunk duct R' of the outlet side comprises an air-conditioning apparatus P', advantageously an outlet blower. The zone duct Z' comprises likewise a zone duct and a control member $S_1'$ closing and opening the zone duct in the joining point of the zone duct of the trunk duct R' of the outlet side, said member being controlled by a control unit $E_1'$. Respectively, the outlet air line between the space to be air-conditioned and the zone duct $Z_1'$ comprises a control member $S_{1.1}$, controlled by a controller unit $E_{1.1}$. Each space to be air-conditioned may comprise said apparatus arrangements of the outlet side. Also feasible is such an embodiment of the invention in which no ducts exist in the outlet side, but from the space to be air-conditioned the air is removed by the aid of overpressure produced by an air-conditioning apparatus P of the incoming air side, e.g. a blower. The space to be air-conditioned may thus be provided with an outlet duct directly out of doors. In the system of the invention the control units of all control members S and apparatus P are interconnected to be in data transfer connection by the aid of a data bus T. Respectively, governing between each controller unit and the setting means of the control member associated therewith has been arranged. Said governing is indicated in FIG. 2 by letter P.

In the exemplary design of FIG. 2 the operation of the apparatus in changing situations is as follows.

Let us assume that an air-conditioning installation is in a stable state and that air is brought to all spaces and areas of the installation to be air-conditioned in order to provide air in such quantity which is consistent with the situation and loading of the plan. As the loading of the space H increases, for instance, because of increased number of people so that the required increase of air quantity is 25%, the controller unit $E_{1.1}$ of the control member $S_{1.1}$ of the incoming air duct $C_{1.1}$ of the space H transmits information to the controller unit $E_1$ of the control member $S_1$ of the zone $Z_1$ about the increased air need. The controller unit $E_1$ of the control member $S_1$ of the zone $Z_1$ calculates on the basis of the specific graphs of the components and the design parameters of the system new setting data for all control members of the zone in a changed situation so that the air quantity of the space H is increased by 25% and the situation in other spaces of the zone remains the same.

About the increased air need said zone controller unit $E_1$ informs onwards to the controller unit $E_p$ of the air-conditioning apparatus P, which calculates the situation of the entire installation and determines a new set value of the apparatus unit P corresponding to the increased air quantity, for instance a new volumetric air rate which a test unit, e.g. a blower blows. When the new set value of the apparatus unit P has been obtained from a computer pattern included in the controller unit E, the set values of all other control members are at the same time known and available for the control units of said control members controlling the air flow. The apparatus unit P transmits via its control units $E_p$ a change command which the zone controller units of the control members of the zone lines tranmit further to the controller units of the control members e.g. control dampers disposed into the ducts leading to the spaces to be air-conditioned. A simultaneous change is thus implemented in the entire system and as the only notable change remains the increase of the air quantity of the space H by the desired 25%.

In a situation in which the capacity of the installation is in 100% use no air-conditioned space or area is allowed to have more or less air than that calculated for it in the situation in question, unless no programmed factor places said space in a higher priority status than the others. Instead, in a situation in which part of the capacity remains unused because of lower loading in some spaces, the free capacity may be directed and distributed to spaces which ask for it in the ratio of their needs and priority status.

With the air-conditioning procedure of the invention and the system of the procedure is thus guaranteed provision of an air quantity planned for all situations at the minimum pressure and minimum energy corresponding to each situation. The system also permits a space-specifically realized control and it permits an efficient and speedy isolation of a fire area in fire situations by altering the pressure conditions of the spaces to be air-conditioned.

In the design of FIG. 2 all controller units of the installation are connected to the same data transfer bus T. The position of these controller units E in the hierarchy of the installation is solely determined by programs so that all units are able to receive and transmit data.

In the design of FIG. 3, the communication between the controller units E is divided physically into two separated planes A and B. On plane A the communication takes place between the zone controller units $E_1$, $E_2$, $E_3$ and the controller unit $E_p$ of the apparatus P. On plane B, the data transfer communication takes place between each zone unit $E_1, E_2, E_3 \ldots E_n$ and, subjected thereunder, the controller units $E_{1.1}, E_{1.2} \ldots E_{2.1}, E_{2.2} \ldots$ of the control members leading to the spaces to be air-conditioned. An advantage in said system is low bus loading.

In the design presented in FIG. 4, the controller unit $E_p$ of the air-conditioning apparatus of the trunk line is further connected from the process plane to the rest of the data system X of the building.

FIG. 5 presents a more detailed block diagram presentation on the control of an air-conditioning apparatus P, of the opening station of a control damper disposed advantageously into the trunk duct R after a blower. The controller unit E comprises in this design an actuating means 10 of a control damper, a pressure transmitter 12 disposed into the trunk duct after the control damper, said transmitter measuring air pressure in said part of the trunk duct R. The controller E consists further of a CPU 13 provided with a CPU section for calculations, a RAM/ROM memory section 13b for storing the data related to the programs and the process, output controls 13c, input signal connections 13d from the setting transmitter of the control damper and possibly for receiving data from other transmitters, and a serial connection bus 13e, as well as an A/D converter 13f. The data from the pressure transmitter 12 is directed along a data bus 14 to the CPU 13. Respectively, the setting data of the control damper from the setting transmitter 11 is directed along a data transfer bus 15 to the CPU 13 of the controller unit, into its block 13f. From the block 13c, that is, from the outlet connection of the CPU is provided a governing step 16 for the actuating means 10 defining the setting of the control damper.

FIG. 6 presents the control of the air-conditioning apparatus P, advantageously of a blower. The control unit E of the blower P comprises, as in FIG. 6, a frequency converter 17 converting the rpm of the blower P. In the trunk line R on the outlet side of the blower P is located a pressure pick-up 18. The central governing part 19 of the controller E comprises the central functional components in the embodiment of the figure, corresponding to those in the design of FIG. 6. The CPU 19 comprises computer programs 19a, an output 19c of the memory block 9b, input connections 19d, a serial connection bus 19e, and an A/D converter 19f. From the pressure pick-up 18 an input signal is conducted along a data transfer bus 20 into the A/D converter section 19f of the CPU 19. From the output 19c of the CPU 19, a governing 21 is provided for the frequency converter 17 for producing an rpm set value signal of the blower P for the frequency converter.

FIG. 7 presents the controller unit E of the control damper S disposed in the zone duct Z. The unit Z consists, as shown in the figure, of an actuating means 22 for the control damper with which the computer controls the position of the damper. A position pick-up 23 of the control damper is further connected to the CPU 24, which comprises programs 24a, a memory 24b, an output connection 24c, input connections 24d, a serial connection 24e, and an A/D converter unit 24f, to which the pick-up information from the pick-up 23 is carried along the bus 25. To the setting means of the control damper is transmitted control data through the control 26 from the output 24c of the CPU 24.

FIG. 8 presents a control damper S used in the procedure of the invention, said control damper being disposed in the duct C leading to a space to be air-conditioned. The controller unit E of said control damper comprises the governing 27 of the setting of the control damper, a pick-up 28 indicating the position of the control damper, a temperature pick-up 29 inserted in the air-conditioning line, and a temperature pick-up 30 placed in the room space. From the pick-up 30 a data bus 31 is connected to the CPU 32 of the controller E. Respectively, from the temperature pick-up 29 a data bus 33 in the air duct C is connected to the CPU 32. From the position pick-up 28 a data bus 34 is connected to the CPU 32. From the CPU 32 is connected further an output bus 34 to the setting means 27 for transmitting a signal determining the position of the control damper to the setting means. The apparatus comprises furthermore a computer section, a CPU section, a memory section, and a governing message section. The apparatus comprises further a remote control means 36 by the aid of which a remote control centre can be transmitted wirelessly to the unit 32 for altering its set values or for reading wirelessly the temperature and/or setting values transmitted thereto.

We claim:

1. A procedure for controlling and maintaining air currents or equivalent in an air-conditioning installation or equivalent, said air conditioning installation comprising one or several air conditioning machines (P) for producing the desired flows, and one or several duct systems for conducting the flows into the desired room spaces ($H_1, H_2 \ldots$) or equivalent, and/or from room spaces ($H_1, H_2 \ldots$) or equivalent, said duct systems being composed of requisite trunk, zone and room duct systems (R,Z,C), and said duct systems being provided with three or more control members ($S_1, S_{1.1}, S_{1.2}, \ldots ; S_2, S_{1.1}, S_{2.2} \ldots$) on different levels of hierarchy, for controlling the air currents or equivalent, and with one or several control systems for defining, controlling and maintaining the requisite air flows or equivalent, in which control systems are used such controller units ($E_1, E_{1.1}, E_{1.2} \ldots ; E_2, E_{2.1} \ldots$) between which exists a data transfer connection through the data transfer buses ($T_1$) or equivalent and said controller units ($E_1, E_{1.1}, E_{1.2} \ldots ; E_2, E_{2.1} \ldots$) having a memory for storing data and programmable capacity for processing the data, characterized in that in the procedure the volumetric flow rates of the air required at different points of the air conditioning system at different times are defined on the basis of the air temperature and/or air quality and/or air noise levels and/or air pressure conditions, and/or other equivalent factors, and on the basis of the defined volumetric air flow rates at the same time, the combination of the set values of the control members ($S_1$, $S_{1.1},S_{1.2}\ldots;S_2,S_{2.1},S_{2.2}\ldots$) and of the air conditioning machines (P) is defined at the same time, with which the defined volumetric air flow quantities are realized, and at the same time the required control members ($S_1,S_{1.1},S_{1.2}\ldots;S_2,S_{2.1},S_{2.2}\ldots$) and the air-conditioning machines (P) are set to the set values consistent with said set value combination, and that when any air current in the system, respectively its volumetric flow rate is changed, a new set value combination is determined for the control members ($S_1,S_{1.1},S_{1.1},S_{1.2}\ldots;S_2,S_{2.1},S_{2.2}\ldots$) and for the air-conditioning machine (P), and the control members ($S_1,S_{1.1},S_{1.1},S_{1.2}\ldots;S_2,S_{2.1},S_{2.2}\ldots$) and for the air-conditioning machines (P) are set to the settings implied by the new combination.

2. Procedure according to claim 1, characterized in that for the set values of the control members ($S_1,S_{1.1},S_{1.2}\ldots;S_2,S_{2.1},S_{2.2}\ldots$), such set values are used which are either directly or indirectly setting data of the actuating members controlling the volumetric air flow rate.

3. Procedure according to claim 1, characterized in that the set value is given in the form of an air resistance coefficient or equivalent regarding the respective control member or a larger entity associated with the control member.

4. Procedure according to claim 3, characterizred in that in the procedure is used a memory record for each control member ($S_1,S_{1.1},S_{1.2}\ldots;S_2,S_{2.2}$.), in which the air resistance coefficient and the corresponding setting of the control member ($S_1,S_{1.1},S_{1.2}\ldots;S_2,S_{2.1},S_{2.2}\ldots$) are stored, each control member ($S_1,S_{1.1},S_{1.2}\ldots;S_2,S_{2.1},S_{2.2}\ldots$) being set in the procedure to a setting which is determined by the controller unit ($E_1,E_2\ldots$) of the control member ($S_1,S_{1.1},S_{1.2}\ldots;S_2,S_{2.1},S_{2.2}\ldots$) on a higher hierarchical level in the control system.

5. Procedure according to claim 1, characterized in that for determining the set value combination are used values related to air-conditioning technology of parts of the air conditioning system stored in the memory of the control system, in particular their flow technology values.

6. Procedure according to claim 1, characterized in that the data required in seting the control members and/or the air-conditioning machines are stored in the memory of each control member ($S_1,S_{1.1},S_{1.2}\ldots;S_2,S_{2.1},S_{2.2}\ldots$) and/or of a separate controller unit ($E_1,E_{1.1},E_{1.2}\ldots;E_2,E_{2.1},E_{2.2}\ldots$) of the air-conditioning machine ($P_1,P_2\ldots$).

7. Procedure according to claim 1, characterized in that determining the set value combination takes place in the control system employing an air-conditioning balancing calculation method known in itself in the art.

8. Air-conditioning system comprising at least one air-conditioning machine (P) producing air flow, and ducts branching from the main duct into the spaces to be air-conditioned, e.g. into room spaces ($H_1;H_2\ldots$), halls, cupboards or focussed ventilation apparatus, or equivalent, said ducts comprising control members controlling the volumetric air flow rate, and a controller unit for each of said ducts, characterized in that the main duct ($Z_1$) comprises a control member ($S_1$) controlling the total volumetric air flow rate of the main duct, and a controller unit ($E_1$) therefor, and in the branch ducts ($C_{1.1},C_{1.2},C_{1.3}\ldots$) control members ($S_{1.1},S_{1.2},S_{1.3}\ldots$) controlling the volumetric air flow rate of the branch ducts, and controller units ($E_{1.1},E_{1.2},E_{1.3}\ldots$) therefor, and that between the controller units ($E_1$) of the control members ($S_1$) of the main duct ($Z_1$) and the controller units ($E_{1.1},E_{1.2},E_{1.3}\ldots$) of the control members ($S_{1.1},S_{1.2},S_{1.3}\ldots$) of the branch ducts ($C_{1.1},C_{1.2},C_{1.3}\ldots$) exists a data transfer connection through data transfers buses (T) or equivalent, the setting of the actuating means contolling the volumetric air flow rate of the control members ($S_{1.1},S_{1.2},S_{1.3}\ldots$) of the branch ducts being determined centrally and simultaneously by a set value combination derived from the controller unit ($E_1$) of the control member ($S_1$) of the main duct ($Z_1$), and further comprising at least one trunk duct (R) and zone ducts ($Z_1,Z_2,Z_3\ldots$) branching off therefrom, and room ducts ($C_{1.1},C_{1.2}\ldots;C_{2.1},C_{2.2}\ldots C_{3.1},C_{3.2},C_{3.3}\ldots$) branching further off from these to the room spaces or equivalent to be air-conditioned, and that the system comprises at least one air-conditioning machine (P) in the trunk duct ($Z_1$) producing air flow and at least one control member ($S_1$ and/or $S_2$ and/or $S_3\ldots$) controlling the volumetric air flow rate entering or leaving one zone duct, and control members ($S_{1.1},S_{1.2}\ldots;S_{2.1},S_{2.2}\ldots;S_{3.1}\ldots$) controlling the volumetric air flow rate conducted to room spaces, focussed ventilation points or equivalent, or an air flow derived therefrom, and that the system comprises data transfer buses (T) or equivalent between the air-conditioning machine (P) and the controller units ($E_p;E_1;E_{1.1},E_{1.2}\ldots;E_2,E_{2.1}\ldots$) of the control members, by the aid of which the control members $S_1,S_{1.1},S_{1.2}\ldots;S_2,S_{2.1}\ldots$) and the air-conditioning machines (P) are at the same time governed to be set to the settings of a given set value combination determined by calculations.

9. Air-conditioning system comprising at least one air-conditioning machine (P) producing air flow, and ducts branching from the main duct into the spaces to be air-conditioned, e.g. into room spaces ($H_1;H_2\ldots$), halls, cupboards or focussed ventilation apparatus, or equivalent, said ducts comprising control members controlling the volumetric air flow rate, and a controller unit for each of said ducts, characterized in that the main duct ($Z_1$) comprises a control member ($S_1$) controlling the total volumetric air flow rate of the main duct, and a controller unit ($E_1$) therefor, and in the branch ducts ($C_{1.1},C_{1.2},C_{1.3}\ldots$) control members ($S_{1.1},S_{1.2},S_{1.3}\ldots$) controlling the volumetric air flow rate of the branch ducts, and controller units ($E_{1.1},E_{1.2},E_{1.3}\ldots$) therefor, and that between the controller units ($E_1$) of the control members ($S_1$) of the main duct ($Z_1$) and the controller units ($E_{1.1},E_{1.2},E_{1.3}\ldots$) of the control members ($S_{1.1},S_{1.2},S_{1.3}\ldots$) of the branch ducts ($C_{1.1},C_{1.2},C_{1.3}\ldots$) exists a data transfer connection through data traansfer buses (T) or equivalent, the setting of the actuating means controlling the volumetric air flow rate of the control members (Sqhd $1.1,S_{1.2},S_{1.3}\ldots$) of the branch ducts being determined centrally and simultaneously by a set value combination derived from the controller unit ($E_1$) of the control member ($S_1$) of the main duct ($Z_1$) and wherein each said controller unit associated with each control member is provided with a memory in which are stored a record containing the air resistance coefficients of the respective control member and the position data of the actuating means controlling the air flow of the control member, associated with each air resistance coefficient.

* * * * *